United States Patent [19]

Torii et al.

[11] Patent Number: 5,214,531
[45] Date of Patent: May 25, 1993

[54] OPERATION CONTROL SYSTEM FOR A SCANNING GALVANOMETER

[75] Inventors: Nobutoshi Torii, Hachioji; Hiroshi Wakio, Minamitsuru, both of Japan

[73] Assignee: Fanuc Ltd., Minamitsuru, Japan

[21] Appl. No.: 834,566

[22] PCT Filed: May 28, 1991

[86] PCT No.: PCT/JP91/00744

§ 371 Date: Feb. 14, 1992

§ 102(e) Date: Feb. 14, 1992

[87] PCT Pub. No.: WO92/00542

PCT Pub. Date: Jan. 9, 1992

[30] Foreign Application Priority Data

Jun. 22, 1990 [JP] Japan .................. 2-164956

[51] Int. Cl.⁵ .............................. G02B 26/08
[52] U.S. Cl. .................... 359/223; 250/236; 346/109; 359/197
[58] Field of Search .............. 359/196–199, 359/223, 226; 346/109; 250/236

[56] References Cited

U.S. PATENT DOCUMENTS 3,321,766 5/1967 Everest .................. 346/109
4,351,005 9/1982 Imai et al. ............... 346/109

FOREIGN PATENT DOCUMENTS 2947266 6/1980 Fed. Rep. of Germany .
2157419 10/1985 United Kingdom .

Primary Examiner—Bruce Y. Arnold
Assistant Examiner—James Phan
Attorney, Agent, or Firm—Staas & Halsey

[57] ABSTRACT

An operation control system for a scanning galvanometer associated with an arc sensor (20) of a welding robot for sensing a weld line, and having a swing mirror (23) integral therewith for a laser beam scanning. A memory (43) stores waveform data of a galvanometer drive command current obtained by synthesizing a constant-speed command current and an acceleration/deceleration command current, and an address circuit (42) causes the waveform data to be output from the memory (43) at predetermined intervals. A D/A converter (44) converts the output of the memory (43) to an analog value, and a scanner drive circuit (45) drives the galvanometer (22), which swings the swing mirror (23) to detect the weld line. Accordingly, the scanning galvanometer (22) is driven in accordance with the waveform of the galvanometer drive command current in such a manner that it is driven at a constant angular velocity in swing angle regions other than turning points, and at a constant angular acceleration in the vicinity of the turning points. Therefore, the swing angle is accurately controlled over the entire operating range, and the change of direction of the swing angle at the turning points is effected in a very short time. Further, overshoot does not occur at the turning points of the triangular wave, and as a result, the measurement for detecting the weld line by a laser beam scanning can be effectively executed.

6 Claims, 6 Drawing Sheets

OPERATION CONTROL SYSTEM FOR A SCANNING GALVANOMETER

DESCRIPTION

1. Technical Field

The present invention relates to a system for controlling the operation of a galvanometer used in a welding robot as a scanner for an arc sensor which senses a weld line, and more particularly, to an operation control system for a scanning galvanometer having an increased effective operating angle range.

2. Background Art.

Conventionally, galvanometers capable of detecting a swing angle are used as a scanner for an arc sensor, to achieve an accurate scanning of a laser beam.

This type of galvanometer, however, has a relatively large size due to the size of the swing-angle detection mechanism incorporated therein, requires a special drive circuit, has a complicated structure, and is expensive. Further, the detected swing angle is output as an analog value, and therefore, an A/D converter is required; this makes the control circuit complicated and susceptible to noise.

Accordingly, inexpensive and small-sized galvanometers having no swing-angle detecting function are now used, as such galvanometers can be operated by simply supplying a drive current thereto, and thus have a simple construction of circuit and are not influenced by noise.

Nevertheless, such conventional galvanometers having no swing-angle detecting function are operated by the following control methods, and still have problems.

(1) The galvanometer 22 shown in FIG. 6(a) is provided with an external mechanism 40 for detecting a laser beam 26. This detection mechanism 40 comprises a slit 40a and a light-receiving unit 40b, and the laser beam 26 from a laser oscillator 21 is reflected by a swing mirror 23 and passed through the slit 40a. Then, using the swing angle $\theta_o$ of the galvanometer 22 at this time as a reference, an arc sensor starts a measurement for detecting a weld line by using the laser beam.

Since this galvanometer 22 must be provided with the detection mechanism 40 using a laser beam, however, it has a complicated structure.

(2) The galvanometer 22 shown in FIG. 6(b) is operated by a drive command current having a sine waveform, and the swing angle $\theta$ of the galvanometer 22 continuously follows the sine waveform, with a constant delay.

In this galvanometer 22, however, a change of the swing angle is small at regions A in the vicinity of the turning points where a leftward swing is changed to a rightward swing (or vice versa), but the arc sensor continuously measures the distance from the workpiece at predetermined intervals $\Delta t$ (e.g., at intervals of 2560/sec). Accordingly, the frequency of measurement is relatively too high in the vicinity A of the turning points, and thus a part of the measurement is useless.

(3) When using a triangular wave to eliminate a useless part of the measurement present in the vicinity of the turning points, the galvanometer 22 follows the triangular wave B with a constant delay, as shown in FIG. 6(c).

Nevertheless, overshoot occurs at the turning points, and further, the delay direction is reversed for the rightward and leftward swings with respect to the triangular wave B. Accordingly, the measurement cannot be carried out accurately at regions C in the vicinity of the turning points, and thus the measurement at these regions cannot be used.

DISCLOSURE OF THE INVENTION

The present invention was created in view of the above circumstances, and an object thereof is to provide an operation control system for a scanning galvanometer in which the swing angle is accurately controlled over an entire operating angle whereby a measurement using a laser beam can be effectively carried out.

To achieve the above object, the present invention provides an operation control system for a scanning galvanometer associated with an arc sensor of a welding robot for sensing a weld line and having a swing mirror integral therewith for a laser beam scanning, the operation control system comprising a memory for storing waveform data of a galvanometer drive command current obtained by adding up currents corresponding to a swing angle of the galvanometer, an angular velocity of the swing angle, and an angular acceleration of the swing angle, an address circuit for causing the waveform data to be output from the memory at predetermined intervals, a D/A converter for converting an output from the memory into an analog value, a galvanometer drive circuit for amplifying an output signal of the D/A converter and driving the galvanometer, and the swing mirror being rotated together with the galvanometer.

The galvanometer drive command current is obtained by synthesizing a constant-speed command current and an acceleration/deceleration command current, and waveform data thereof is stored in the memory. The address circuit causes the waveform data to be output from the memory at predetermined intervals, the D/A converter converts the output of the memory to an analog value, and the galvanometer drive circuit drives the galvanometer. The swing mirror is rotated together with the galvanometer for sensing a weld line.

Namely, the galvanometer is driven at a constant angular velocity in swing angle regions other than the turning points, and at a constant angular acceleration at the turning points, in accordance with the waveform of the galvanometer drive command current, whereby the swing angle is accurately controlled over the entire operating range. Further, the change of direction of the swing angle at each turning point is effected in a very short time, and thus overshoot does not occur at the turning points of the triangular wave. Accordingly, the measurement for sensing a weld line by a laser beam scanning can be effectively carried out.

BEST MODE OF CARRYING OUT THE INVENTION

An embodiment of the present invention will be described with reference to the drawings.

Figure 2:
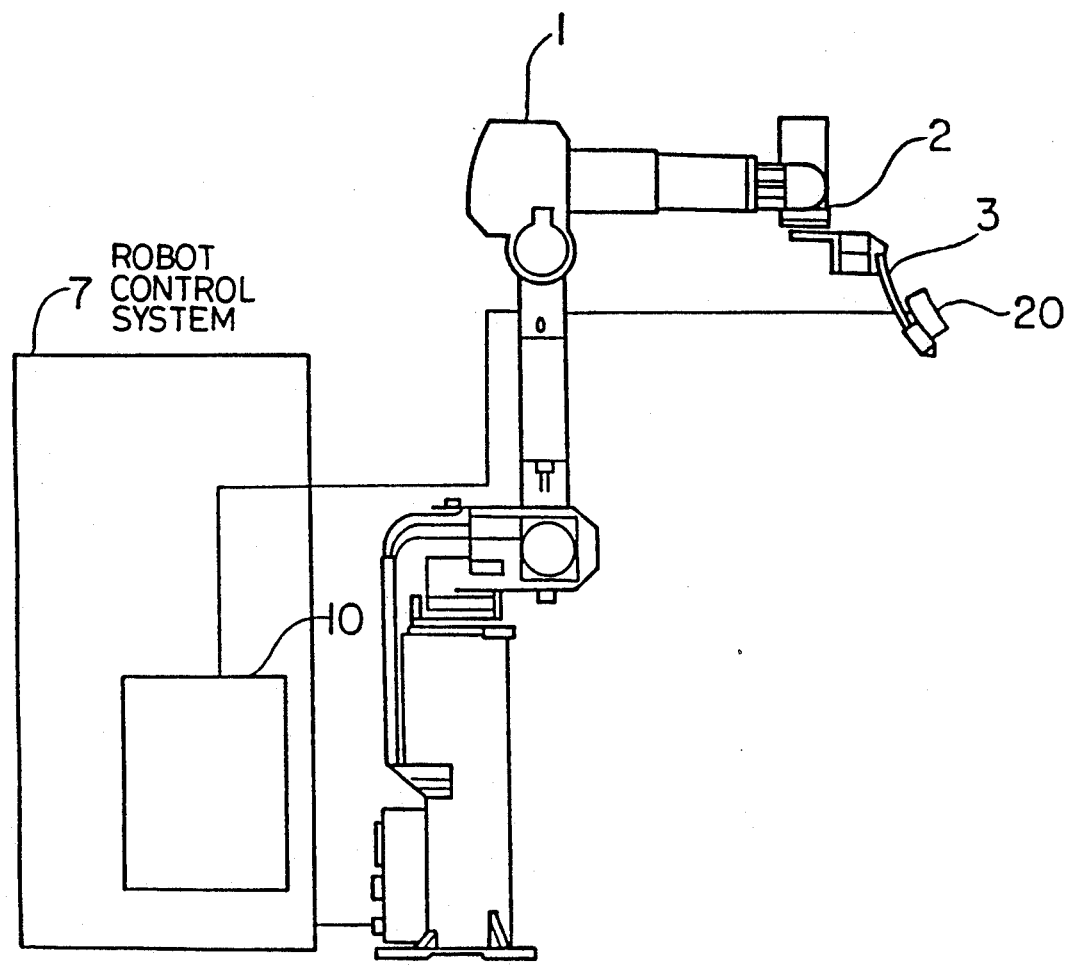
FIG. 2 is a view showing an external appearance of a welding robot.

FIG. 2 illustrates the external appearance of a welding robot. As shown in the Figure, a torch 3 is attached to a distal end of a hand 2 of the robot 1, and is provided with an arc sensor unit 20, and the robot 1 is controlled by a robot control system 7 provided with a built-in arc sensor control unit 10.

Figure 3:
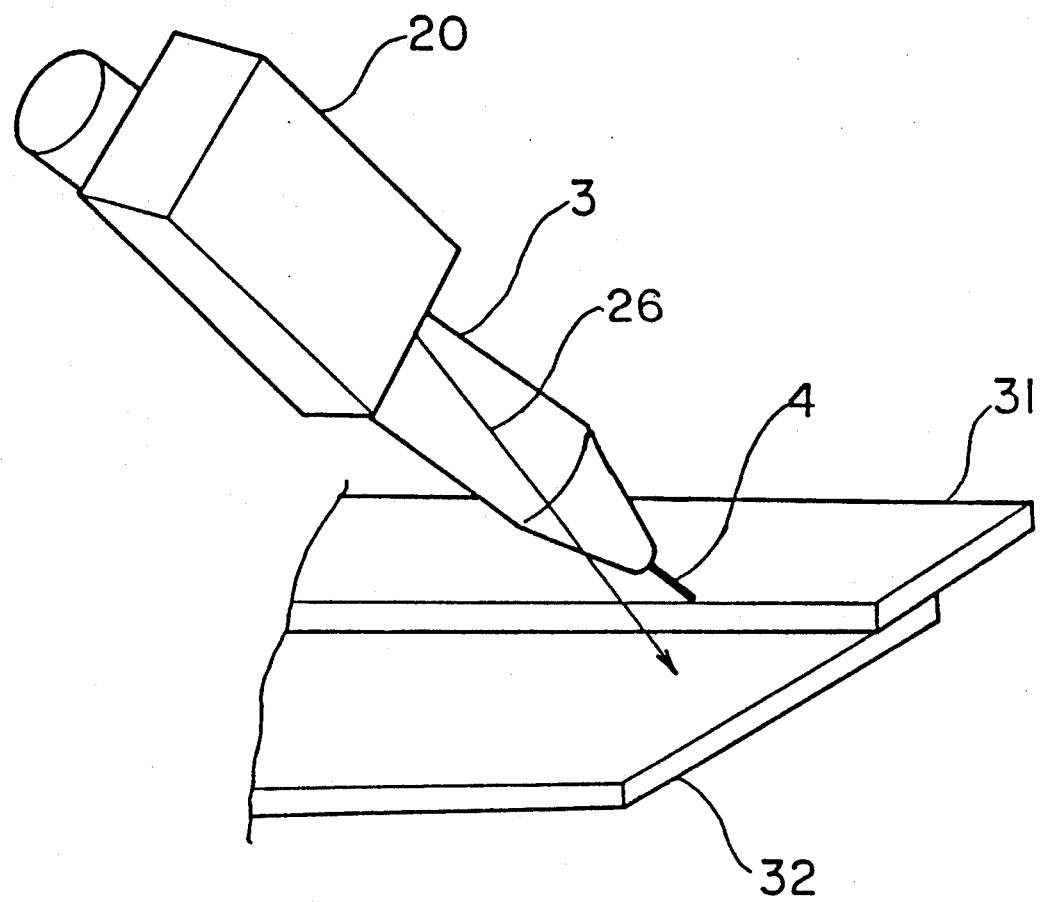
FIG. 3 is a view showing in detail a torch and peripheral elements thereof.

FIG. 3 shows the torch 3 and peripheral elements thereof. As shown in the Figure, an electrode 4 projects from the distal end of the torch 3, workpieces 31 and 32 are stacked for welding, and the arc sensor unit emits a laser beam (search laser beam) 26 for detecting a join between the workpieces 31 and 32.

Figure 4:
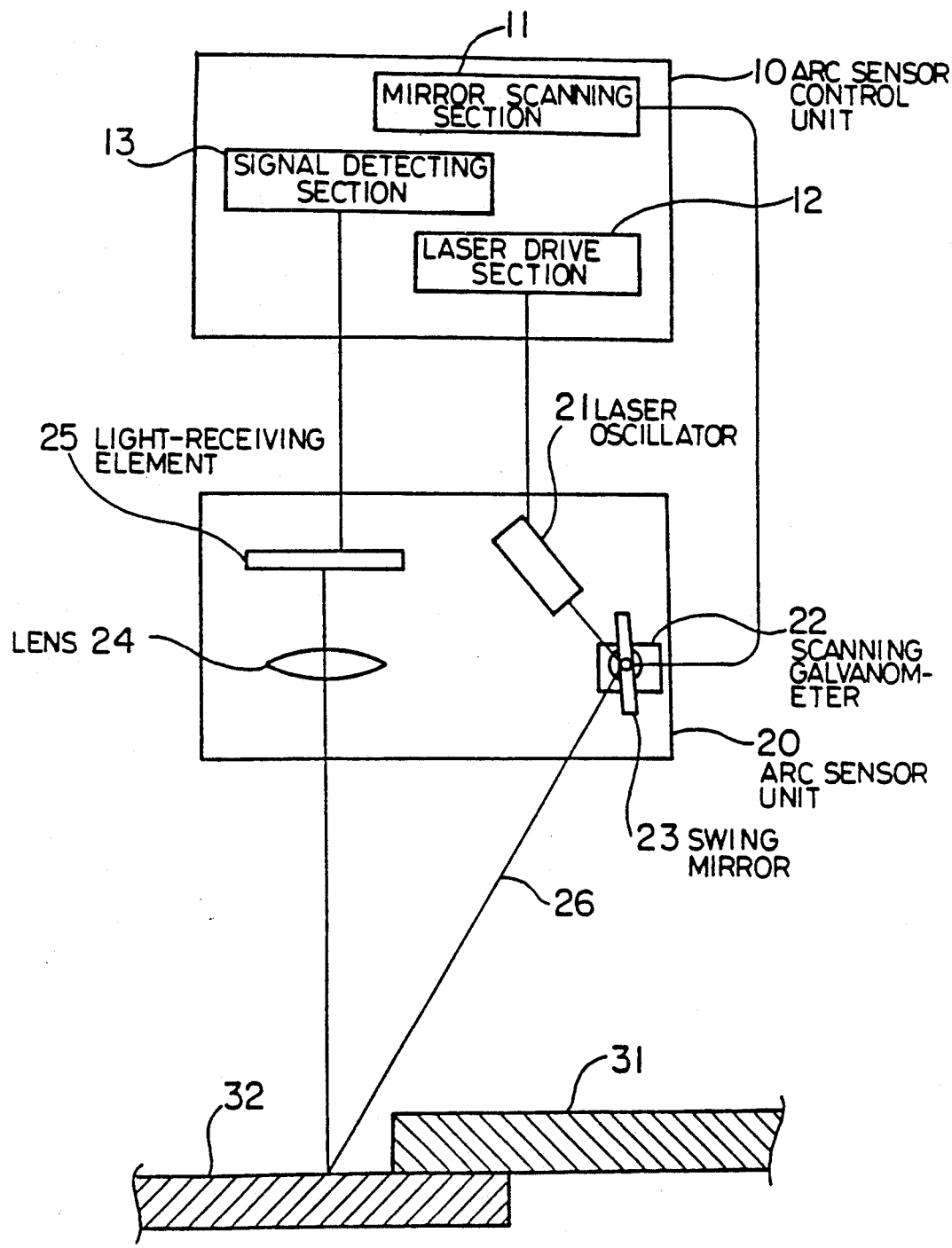
FIG. 4 is a block diagram showing an arc sensor unit and an arc sensor control unit.

FIG. 4 is a block diagram showing the arc sensor unit 20 and the arc sensor control unit 10. The arc sensor control unit 10 comprises a mirror scanning section 11, a laser drive section 12, and a signal detecting section 13. The mirror scanning section 11 includes a drive circuit for driving a scanning galvanometer 22, together with a swing mirror 23, mentioned later, and other elements as described in detail hereinafter.

The arc sensor unit 20 is composed of a laser oscillator 21, the scanning galvanometer 22, the swing mirror 23, which is swung by the scanning galvanometer 22, a lens 24, and a light-receiving element 25.

The scanning galvanometer 22 comprises a torsion spring, a magnet, a coil wound around the magnet, and a damper (none of which is shown), and the swing mirror 23 is securely attached to the shaft (not shown) of the galvanometer. The galvanometer 22 rotates the swing mirror 23 to an angle at which a torque proportional to a galvanometer drive command current flowing through the coil and a control torque exerted by the torsion spring are balanced, as described in detail later.

The laser oscillator 21 is supplied with a drive power from the laser drive section 12 and effects a laser oscillation to thereby emit a laser beam 26. The galvanometer 22 is driven by a drive command current from the mirror scanning section 11, to thereby swing the swing mirror 23, and the motion of the swing mirror 23 causes the laser beam 26 to scan the workpieces 31 and 32 to thereby detect a join therebetween. The laser beam 26 is reflected by the workpieces 31 and 32, converged by the lens 24, and input to the light-receiving element 25. Upon receiving the incident light, the light-receiving element 25 outputs a signal, the join between the workpieces 31 and 32, and the location thereof, are detected on the basis of this signal, and the detection signals are supplied to the robot control system 7, which then positions the torch 3 at a welding start point based on those signals. After the start of the welding, the torch 3 is controlled such that it follows the weld line.

Figure 1:
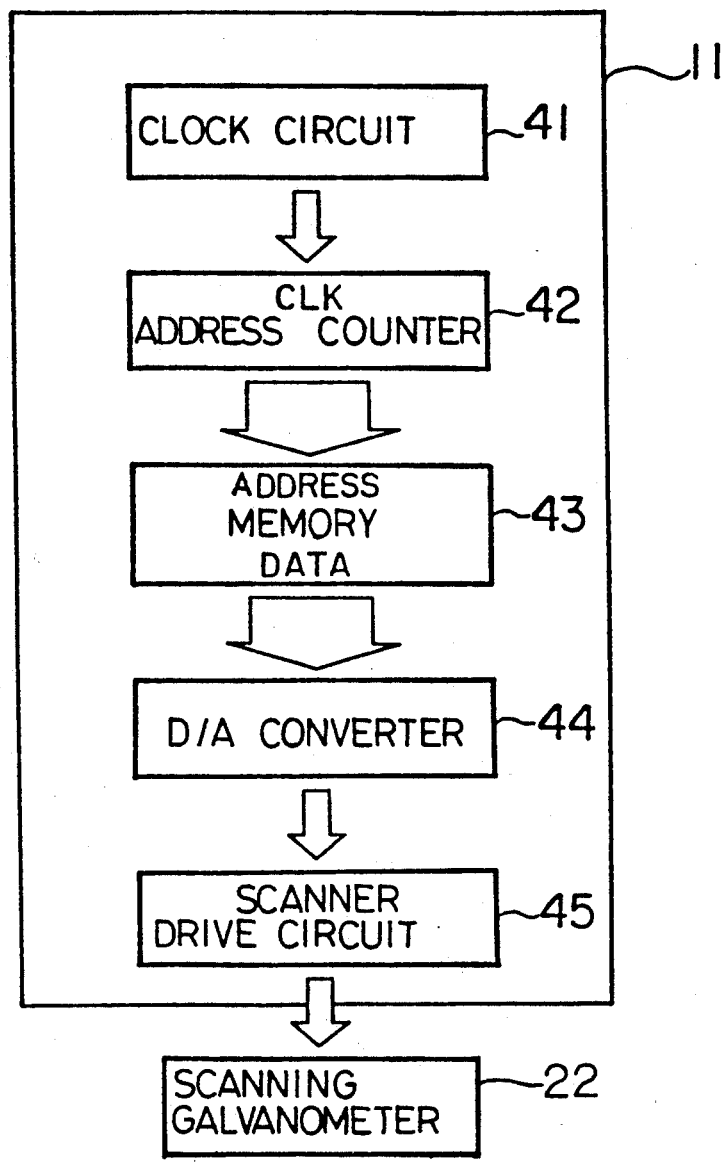
FIG. 1 is a diagram showing a mirror scanning section in detail.

FIG. 1 shows the mirror scanning section 11 in detail. As shown in the Figure, a clock circuit 41 provides a clock signal to an address counter 42 which, upon receiving the clock signal, carries out a count and supplies an output to a memory 43. The memory 43, which is a ROM, stores waveform data of the galvanometer drive command current for driving the galvanometer 22. The waveform data of the galvanometer drive command current is output from the memory 43 and is converted to an analog signal by a D/A converter 44, and is then supplied to a scanner drive circuit 45. The scanner drive circuit 45 then drives the galvanometer 22, and accordingly the swing mirror 23, whereby a laser beam scanning is effected to detect the weld line.

Figure 5:
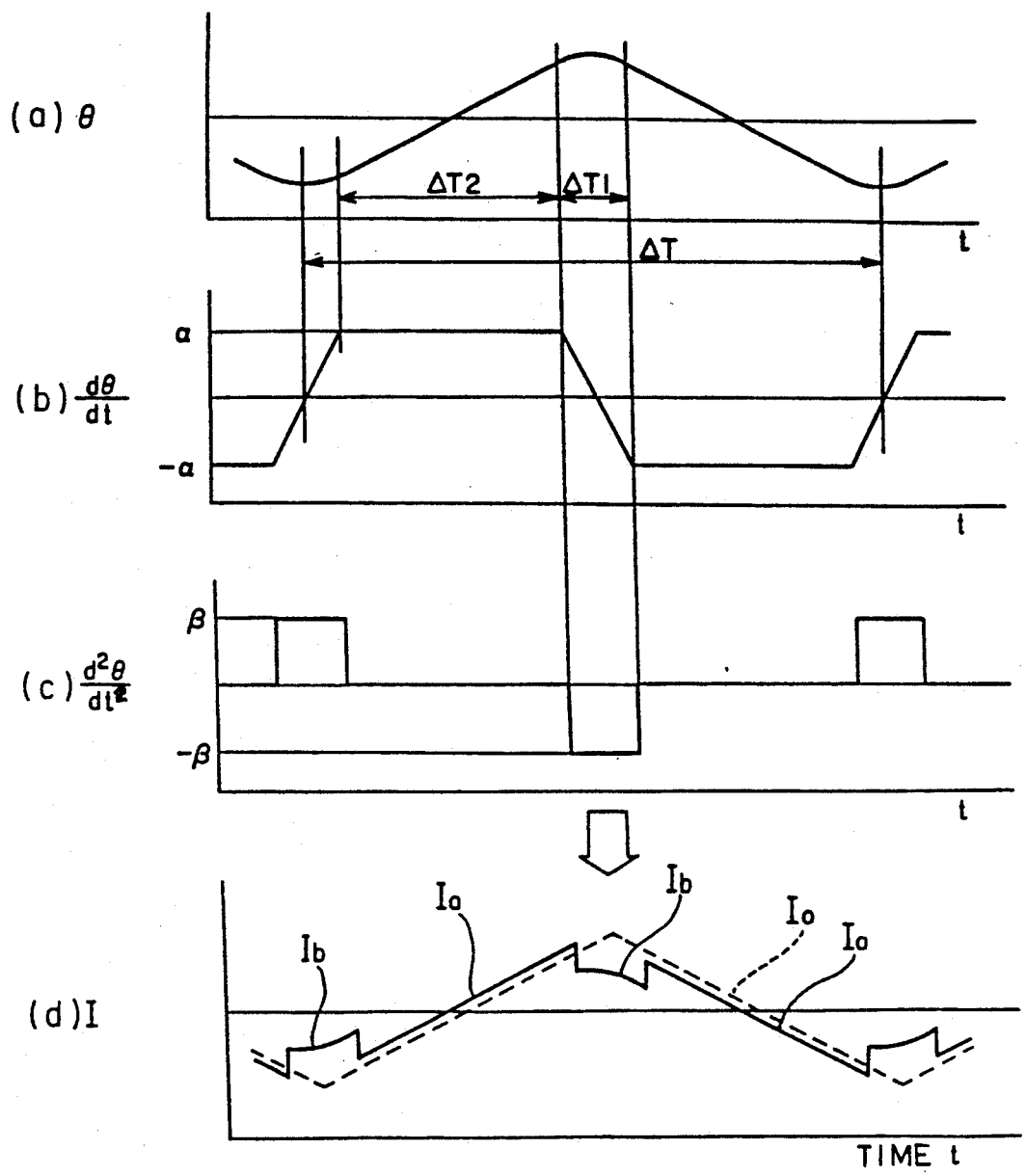
FIG. 5 is a diagram illustrating the procedure for determining the waveform of a galvanometer drive command current.
Figure 6A:
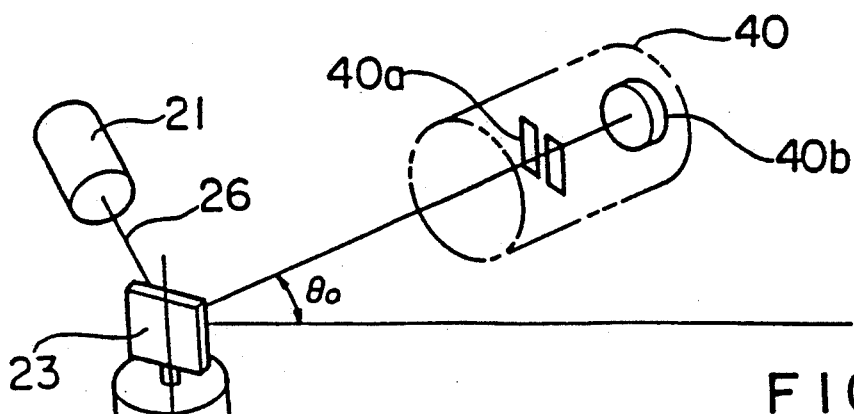
FIGS. 6(a), 6(b), and 6(c) are diagrams each illustrating a control system for a conventional galvanometer having no detecting function.
Figure 6B:
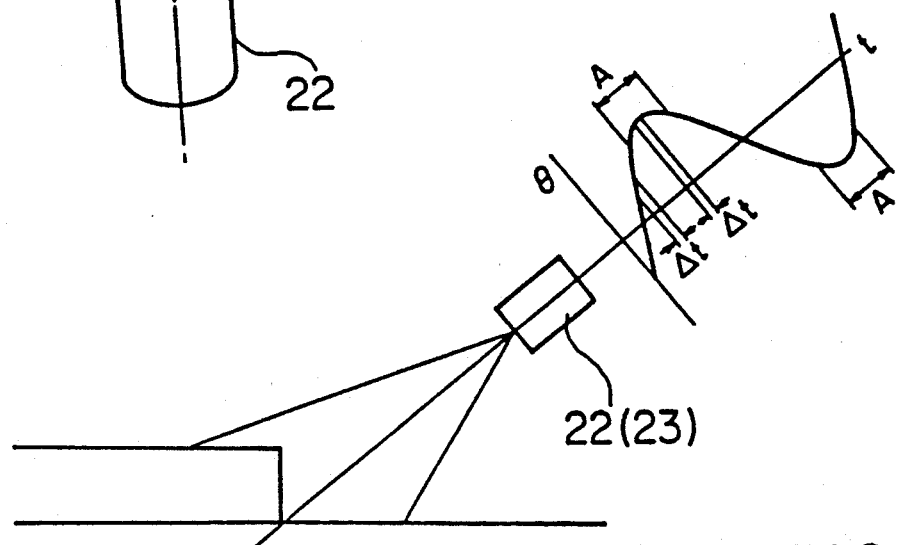
Figure 6C:
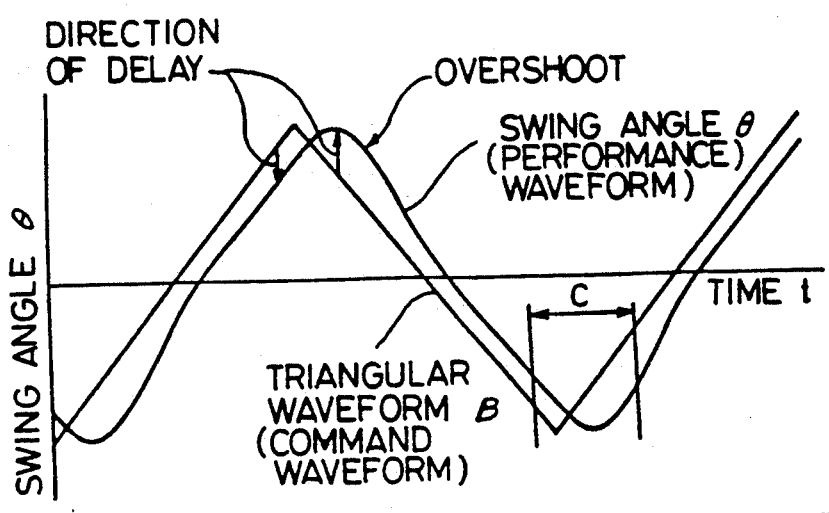

FIG. 5 illustrates the procedure for determining the waveform of the galvanometer drive command current. The waveform of the drive command current I is obtained in the following manner:

(1) First, a performance waveform for the swing angle $\theta$ of the galvanometer 22 is assumed (FIG. 5(a)), and basically the galvanometer is driven in accordance with a triangular wave, except for an acceleration/deceleration period $\Delta T1$ in the vicinity of each turning point. The acceleration/deceleration period $\Delta T1$ is set to the smallest possible value (e.g., 1/50 to 1/100 of the period $\Delta T$, although this $\Delta T1$ is exaggerated in the figure). The acceleration/deceleration period $\Delta T1$ is restricted by the current-carrying capacity of the galvanometer 22, and the current required increases as the acceleration/deceleration period $\Delta T1$ is shortened.

(2) The angular velocity $d\theta/dt$ of the swing angle $\theta$ is set (FIG. 5(b)) such that, during the acceleration/deceleration period $\Delta T1$, the angular velocity $d\theta/dt$ varies at a constant rate, and during the other period $\Delta T2$, the angular velocity $d\theta/dt$ is maintained at a predetermined value $\alpha$.

(3) The angular acceleration $d^2\theta/dt^2$ of the swing angle $\theta$ is set (FIG. 5(c)). To ensure that the angular velocity $d\theta/dt$ will vary at a constant rate during the acceleration/deceleration period $\Delta T1$, the angular acceleration $d^2\theta/dt^2$ is set to a predetermined value $\beta$. For the other period $\Delta T2$, the angular velocity $d\theta/dt$ is not varied, and thus the angular acceleration $d^2\theta/dt^2$ is set to zero.

(4) The swing angle $\theta$, the angular velocity $d\theta/dt$, and the angular acceleration $d^2\theta/dt^2$, set as above, are substituted in the following equation of motion (1) for the galvanometer, to obtain the drive command current I, and the galvanometer 22 is driven by a drive torque proportional to the driving command current I.

$$J \times (d^2\theta/dt^2) + C \times (d\theta/dt) + K \times \theta = I \quad (1)$$

where
- J: sum of the moments of inertia of the galvanometer 22 and the swing mirror 23;
- C: viscosity coefficient of the galvanometer 22;
- K: torque coefficient of the galvanometer 22;
- $\theta$: swing angle of the galvanometer 22;
- I: drive command current supplied to the galvanometer 22.

This equation (1) implies that, if the swing angle $\theta$, the angular velocity $d\theta/dt$ and the angular acceleration $d^2\theta/dt^2$ are set and substituted in the equation (1), and the obtained current value I is supplied to the galvanometer 22 as the drive command current, the galvanometer 22 will perform the assumed motion. The constants J, C, and K are values peculiar to the galvanometer 22, and are obtained by experiment.

The waveform of the galvanometer drive command current I obtained in the above manner is a superposition of an acceleration/deceleration command current Ib on a triangular wave current Ia, as shown in FIG. 5(d).

The waveform of the acceleration/deceleration command current Ib consists of a second order curve, and a command period $\Delta T1$ thereof is 1/50 to 1/100 of the period $\Delta T$ of the drive command current I. Accordingly, the change of direction of the swing angle of the galvanometer 22 at the turning points is carried out in a very short time, and the motion of the galvanometer thereat is performed at the constant angular acceleration $\beta$.

The drive command current I shown in FIG. 5(d) is obtained by compensating for the delay of the operation of the galvanometer with respect to the basic triangular wave current Io.

Therefore, in the present embodiment, the waveform of the drive command current I supplied to the galvanometer 22 is obtained by superposing the acceleration/deceleration command current Ib on the triangular wave current Ia, and thus the galvanometer 22 is driven at the constant angular velocity $\alpha$ in swing angle regions other than the turning points, and at the constant angular acceleration $\beta$ in the vicinity of the turning points, in accordance with the waveform of the drive command current I. Accordingly, the swing angle is accurately controlled over the entire operating range, and the change of direction of the swing angle at the turning points is effected in a very short time. Further, overshoot does not occur at the turning points of the triangular wave, and as a result, the measurement for sensing the weld line by a laser beam scanning can be effectively carried out.

As described above, according to the present invention, the scanning galvanometer is driven in accordance with the waveform of the galvanometer drive command current in such a manner that it is driven at a constant angular velocity in swing angle regions other than the turning points, and at a constant angular acceleration in the vicinity of the turning points. Accordingly, the swing angle of the galvanometer is accurately controlled over the entire operating range, and the change of direction of the swing angle at the turning points is effected in a very short time. Further, overshoot does not occur at the turning points of the triangular wave, whereby the measurement for detecting the weld line by a laser beam scanning can be effectively carried out.

We claim:

1. An operation control system for a scanning galvanometer associated with an arc sensor of a welding robot for sensing a weld line, and having a swing mirror integral therewith for laser beam scanning, comprising:

a memory for storing waveform data of a galvanometer drive command current obtained by adding up currents corresponding to a swing angle of the galvanometer, an angular velocity of the galvanometer, and an angular acceleration of the galvanometer;

an address circuit for causing the waveform data to be output from the memory at predetermined intervals;

a D/A converter for converting an output from the memory to an analog value;

a galvanometer drive circuit for amplifying an output signal of the D/A converter and driving the galvanometer; and the swing mirror being rotated together with the galvanometer.

2. An operation control system for a scanning galvanometer according to claim 1, wherein the galvanometer drive command current comprises an acceleration/deceleration command current for setting a predetermined angular acceleration at which the galvanometer is driven at turning points of motion, and a constant-speed command current for setting a predetermined angular velocity at which the galvanometer is driven in regions other than the motion turning points.

3. An operation control system for a scanning galvanometer according to claim 1, wherein a waveform of the acceleration/deceleration command current comprises a second order curve.

4. An operation control system for a scanning galvanometer according to claim 1, wherein the acceleration/deceleration command current is employed for a very short command time.

5. An operation control system for a scanning galvanometer according to claim 4, wherein the very short command time falls within a range of 1/50 to 1/100 of the period of the galvanometer drive command current.

6. An operation control system for a scanning galvanometer according to claim 1, wherein the galvanometer drive command current is obtained by compensating for a delay in an operation of the galvanometer with respect to a drive command current.

* * * * *

UNITED STATES PATENT AND TRADEMARK OFFICE
CERTIFICATE OF CORRECTION

PATENT NO. : 5,214,531
DATED : May 25, 1993
INVENTOR(S) : Nobutoshi TORII et al.

It is certified that error appears in the above-indentified patent and that said Letters Patent is hereby corrected as shown below:

Title page, under "[86] PCT No.:", delete "PCT/JP91/00744" and insert --PCT/JP91/00722-- therein.

Signed and Sealed this

Eighth Day of February, 1994

Attest:

BRUCE LEHMAN

Attesting Officer    Commissioner of Patents and Trademarks